J. P. EATON.
Sheep Rack.
No. 37,905.
Patented March 17, 1863.
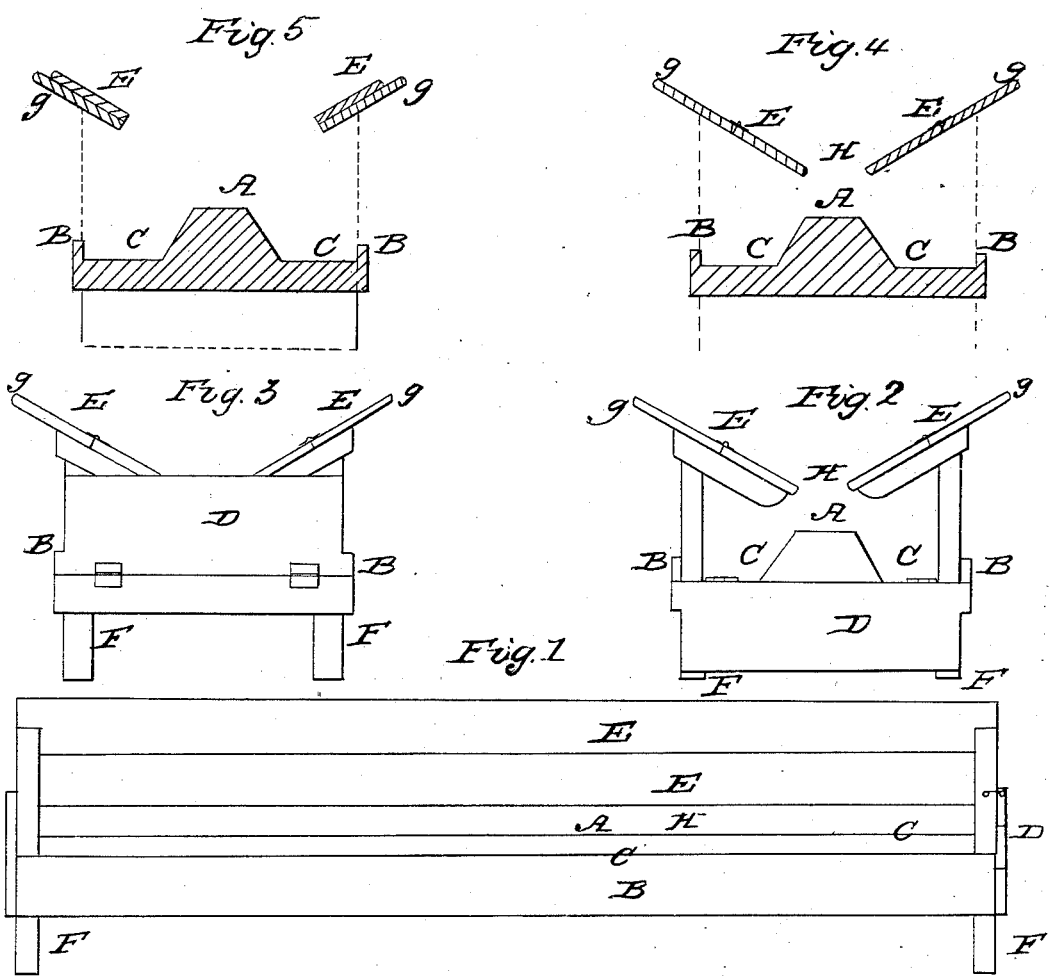

UNITED STATES PATENT OFFICE.

JAMES P. EATON, OF MANCHESTER, NEW HAMPSHIRE.

IMPROVEMENT IN SHEEP-RACKS.

Specification forming part of Letters Patent No. 37,905, dated March 17, 1863.

*To all whom it may concern:*

Be it known that I, JAMES P. EATON, of Manchester, in the county of Hillsborough and State of New Hampshire, have invented a new and Improved Sheep-Rack; and I do hereby declare that the following is a full and fair description thereof, reference being had to the accompanying drawings, making a part of this specification, in which—

Figure 1 represents side elevation. Fig. 2 represents end section with door D let down. Fig. 3 represents end section with door D turned up. Fig. 4 represents a middle section with the inclined feeders let down. Fig. 5 represents a middle section with the inclined feeders turned up.

To enable others skilled in the art to make and use my invention, I will proceed to describe its construction and operation.

I construct two cribs, C C, one on each side of my rack, at such a height from the floor that a sheep may conveniently feed from the cribs C C over the bar or fender B, which is used to keep the feed in the cribs C C, and to prevent waste. I then construct an elevated walk, A, midway between the two cribs, C C. This walk is used mainly to walk on and stand while sweeping out the cribs C C, but it is used conveniently to stand on in feeding the sheep with some kinds of vegetable food, and serves as a division between the two cribs C C, enabling one to feed sheep on one side with one kind of feed, and on the other with another kind. I then make the inclined feeders E E each in two parts hung with hinges so as to turn up while cleaning out the cribs. These are placed on a frame high enough to clear the backs of the sheep, and are made to project out over the sides of the crib toward the letter *g* in Figs. 2, 3, 4, and 5, to protect the fleece of the sheep from seeds, chaff, &c., and also to prevent the sheep from getting at the hay from the top of the inclined feeders, as the hay is always put on the top of these feeders, and being inclined it naturally tends down to the opening H, Figs. 2, 3, 4, where the sheep reach and draw through the opening H such quantities as they require, and prevent all waste of hay. These inclined feeders E E are always down, as in Figs. 2, 3, 4, when the sheep are feeding on hay, and turned up, as in Fig. 5, when the cribs are being cleaned out. The end door, D, made to let down and raise up, being hung with hinges, is used when up to keep the sheep out of the rack, and when let down one can more easily step onto the walk A, and it must always be down when the cribs are swept out.

The object gained by my invention is that it secures a convenient way of feeding and taking care of large flocks of sheep, at the same time economizing the feed, preserving the wool from seed and dirt, which in the usual way of feeding gets into the wool. It is also convenient to feed and to sweep out when necessary.

I claim—

The construction of sheep-racks with elevated walk A between them, in combination with inclined feeders E E, substantially as herein set forth.

J. P. EATON.

In presence of—
CHARLES CLARK,
JAMES K. BARKER.